Patented Nov. 15, 1927.

1,649,668

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

ISO-ALKYL RESORCINOL.

No Drawing. Application filed April 29, 1925. Serial No. 26,814.

The present invention relates to new iso-alkyl resorcinols of the following general formula, $C_6H_3(OH)_2R$, where R is an iso-alkyl group having more than 3 carbon atoms. The invention includes such iso-alkyl resorcinols as iso-butyl, iso-amyl, iso-hexyl resorcinols, etc.

The invention includes the compounds in a pure state as well as in a partially purified state.

The new iso-alkyl resorcinols may be prepared by the reduction of the corresponding iso-acyl resorcinols with a reducing agent, such as, for example, zinc amalgam and hydrochloric acid, followed by purification by redistillation in vacuo, recrystallization from solvents, etc.

The new iso-alkyl resorcinols may also be produced from resorcinol and the corresponding iso-fatty acids by causing the acid and the resorcinol to react in the presence of the condensing agent, such as zinc chloride, at elevated temperatures, forming the intermediate ketone, that is, the iso-acyl resorcinol, which is then purified to a greater or less extent and reduced to form the iso-alkyl resorcinol, using a suitable reducing agent, such as, for example, zinc amalgam and hydrochloric acid.

The following specific examples, which relate to the production of iso-butyl resorcinol, will illustrate methods of preparing the new iso-alkyl resorcinols.

Preparation of iso-butyl resorcinol from iso-butyryl resorcinol: 1 part of iso-butyryl resorcinol is reduced by 2½ parts zinc amalgam in 5 parts of hydrochloric acid (20 Bé.) and 6 parts of water, with vigorous stirring at 105° C. The reduction is complete in about 10 or 12 hours. The reduction product is washed with an equal volume of water and the water layer separated. The reduction product is then distilled in vacuo whereby the last traces of water are removed and finally the iso-butyl resorcinol is distilled. The product is then redistilled, the distillate permitted to solidify into a solid and the solid is recrystallized from a mixture of toluene and petroleum ether, yielding white crystals which have a melting point of about 62–63.5° C. Iso-butyl resorcinol has a boiling point of about 166–168° at 6–7 mm.

Iso-butyl resorcinol may also be produced in a single process from resorcinol and iso-butyric acid, as follows: Twenty parts of anhydrous zinc chloride are dissolved in 100 parts of iso-butyric acid, the solution being aided by heating and stirring. Thirty-three parts of resorcinol are gradually added over a period of about 20 minutes while the temperature is maintained near 135° C. and the reaction mixture is then stirred for a period of about 3 hours in a temperature of about 135° to 145° C. At the end of this time an equal volume of water is added and the mixture is further stirred. The oily reaction product rises to the surface, is separated from the aqueous layer, and washed with an equal volume of water and the water then separated from the washed product. The product is then distilled in vacuo; traces of water and the excess iso-butyric acid being first distilled over and finally the iso-butyryl resorcinol being distilled over. The distillate can then be subjected to reduction, without isolation of the pure iso-butyryl resorcinol, by treating it as above described.

The iso-butyryl resorcinol may be further purified by redistillation and crystallization from a mixture of toluene and petroleum ether. After redistillation and crystallization the product is in the form of white crystals having a melting point of about 67–68.5° C. The iso-butyryl resorcinol has a boiling point of about 173–175° C. at 6–7 mm. pressure. The pure crystals of iso-butyryl resorcinol may also be reduced as described above. It is not necessary, however, to isolate the iso-butyryl resorcinol in a pure crystalline state, but the partially purified product, as distilled off from the reaction mixture, may be directly reduced, as described above.

In a similar manner other iso-alkyl resorcinols, such as the iso-amyl, iso-hexyl, etc. resorcinols, may be produced, either from the corresponding iso-acyl resorcinols, or directly in a single process from resorcinol and the corresponding iso-fatty acid. Among the new iso-alkyl resorcinols so obtainable may be mentioned the following, melting point and boiling point of each compound in a purified state being given:

| | Melting point. | Boiling point 6–7 mm. |
|---|---|---|
| Iso-butyl resorcinol | 62–63.5 | 166–168 |
| Iso-amyl resorcinol | 61–62.5 | 177–178 |
| Iso-hexyl resorcinol | 70–71.5 | 182–183 |

This application is a continuation in part of my prior application, Serial No. 654,928, filed July 31, 1923.

I claim:

1. New products comprising iso-alkyl resorcinols having the following formula, $C_6H_3(OH)_2R$, where R is an iso-alkyl group having more than 3 carbon atoms.

2. As new products pure iso-alkyl resorcinols having the following generally formula, $C_6H_3(OH)_2R$, where R is an iso-alkyl group containing more than 3 carbon atoms, the compounds being crystalline solids.

3. A new product comprising iso-butyl resorcinol having the following formula,

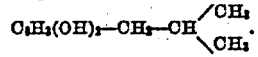

4. As a new product pure iso-butyl resorcinol having the following formula,

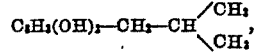

being a white crystalline solid having a melting point of 62–63.5° C. and boiling at 166–168° C. at 6–7 mm. pressure.

In testimony whereof I affix my signature.

ALFRED R. L. DOHME.